2,752,394
METHOD OF MANUFACTURING VANILLIN

Nils Andreas Sörensen, Trondheim, and Jorunn Mehlum, Skaun, Norway

No Drawing. Application December 18, 1951, Serial No. 262,333

4 Claims. (Cl. 260—600)

It is known that vanillin is formed from materials containing lignin, for example wood or similar materials, or from substances containing lignosulphonic acid, e. g. sulphite cellulose waste liquor, by heating the lignin containing material with alkali and an oxidation agent, e. g. molecular oxygen or nitrobenzene. The yields of vanillin obtained by the above decomposition reaction vary with the nature of the raw materials and with the conditions of operation used, but have never been very high.

According to the present invention the yield of vanillin obtained by methods of the above mentioned nature is substantially increased by effecting said decomposition in the presence of one or more alkaline buffers.

The influence of the alkaline buffer is two-fold. Firstly, the decrease of the pH value in the reaction medium which is caused by the action of the buffer protects the formed vanillin against its destruction in the alkaline medium, and secondly an ion selective effect is obtained, which produces substantially higher yields of vanillin at the same pH value in the solution than when such buffer is not added, and the higher yield is obtained by the use of for example a NaOH—Na$_2$S buffer (pH=about 13.5), viz. up to 32.4 grams of vanillin per 100 grams lignin in the raw material, than if a NaOH—Na$_2$CO$_3$-buffer at the same pH is used. In the latter case the yield is 25.0%. If a NaOH-sodium acetate buffer of the same pH is used the yield is 25.2%.

The NaOH—Na$_2$S-buffer has a special advantage in that it may be produced from the waste liquor obtained from the vanillin production process proper, using principles known from the sulphate cellulose industry. Hereby the problem of recovering alkali from the vanillin production in a simple and cheap manner is simultaneously solved.

The so-called white liquor from the manufacturing of sulphate cellulose may be directly used as the buffer in the manufacture of vanillin, after the liquid has first been adjusted to the most favourable pH value (about 13.5) by means of for example Na$_2$S or Na$_2$CO$_3$.

Below are given some examples of carrying the invention into effect.

Example 1

500 cm.$^3$ evaporated sulphite waste liquor, corresponding to 24.3 gr. of lignin, are boiled with 1000 cm.$^3$ white liquor (94 gr. of NaOH and 27 gr. of Na$_2$S per liter) at 150° for 3½ hours. During the boiling operation there is introduced oxygen in an amount corresponding to 3 atoms of 0 per unit of lignin (C$_{10}$H$_{10}$O$_4$=178). The solution is acidified, e. g. by means of H$_2$SO$_4$, and the vanillin is extracted by means of a suitable extraction agent, for example trichloroethylene, benzene or ether. The yield of vanillin is 2.14 gr., equalling 8.8 gr. vanillin per 100 gr. lignin.

Example 2

50 gr. of dried sawdust of spruce fir (=14 gr. of lignin) is boiled with 1000 cm.$^3$ of white liquor for 4 hours at 165° C. During the boiling operation there is blown in oxygen in an amount of at least 4 atoms of 0 per unit of lignin. The cellulose fibres are filtered off, the filtrate is acidified, e. g. by means of H$_2$SO$_4$, and extracted. The yield of vanillin is 1.29 gr., equalling 9.2 gr. of vanillin per 100 gr. of lignin.

Example 3

14 gr. of dried sawdust (=3.92 gr. of lignin) are boiled with 300 cm.$^3$ white liquor and 50 cm.$^3$ of nitrobenzene at 160° C. for 3 hours. The cellulose fibres are filtered off, the filtrate is distilled with steam until all nitrobenzene has distilled off. After cooling azo and azoxybenzene, which have precipitated out, are removed by centrifugal action. The clear solution obtained is extracted either directly with an enolester, e. g. malonic acid di-ethyl ester, or the solution is acidified with H$_2$SO$_4$ and is then extracted as described in Example 1. Yield of vanillin 1.23 gr.=32.4 gr. of vanillin per 100 gr. lignin.

Example 4

14 gr. of dried sawdust (=3.92 gr. of lignin) are boiled with 300 cm.$^3$ sodium hydroxide solution of 8% buffered with sodium carbonate to pH=13.5 and 50 cm.$^3$ of nitrobenzene at 160° C. for 3 hours. The reaction mixture is worked up as in Example 3. Yield of vanillin 0.95 gr.=25.0 gr. vanillin per 100 gr. lignin.

Example 5

14 gr. of dried-sawdust (=3.92 gr. of lignin) are boiled with 300 cm.$^3$ sodium hydroxide solution, buffered with sodium acetate to a pH of about 13.5, and 50 cm.$^3$ nitrobenzene at 160° C. for 3 hours. The reaction mixture is worked up as in Example 3. Yield of vanillin 0.96 gr.=25.2 gr. vanillin per 100 gr. lignin.

In connection with these examples it may be mentioned that the literature often has described yields of up to 8% vanillin with the use of sulphite waste liquor or lignosulphonic acid as raw material. According to Example 1, given above, the inventors have obtained 8.8%, which means an increase of the yield of about 10%. If, however, wood, that is unaltered lignin, is treated in accordance with the invention, the action is relatively far greater. As far as the inventors are aware, the literature never has described yields above 2 gr. of vanillin per 100 gr. of lignin by boiling of wood with alkali and supply of air, whereas the inventors, by boiling in the presence of alkaline buffer in accordance with the invention obtain, as explained in Example 2, over 9 gr./100 gr. lignin, which means a yield increase of several hundred percents.

By substituting nitrobenzene for oxygen Freudenberg et al. have obtained in maximum a yield of 25% calculated on lignin. The inventors obtain, as shown in Example 3, an increase in yield of about 30% by their method.

It may also be emphasized that especially the method of Example 2 provides a relatively cheap method of producing vanillin, which method at the same time has the advantage that if the boiling operation is correctly executed the cellulose fibres obtained will find use as such, at least for certain purposes.

We claim:

1. A method of manufacturing vanillin from products containing a material selected from the class consisting of lignin and lignin sulphonic acid, comprising decomposing said products by means of alkali and an oxidation agent in the presence of an alkaline buffer, said buffer being selected from the group consisting of an aqueous mixture of sodium hydroxide and sodium sulfide and white liquor from the manufacture of sulphate cellulose which contains sodium hydroxide and sodium sulfide.

2. A method according to claim 1, in which the alkaline buffer is a Na₂S—NaOH buffer.

3. A method according to claim 1, in which the buffer used consists of white liquor from the manufacture of sulphate cellulose.

4. A method according to claim 1 in which the buffer used consists of white liquor from the manufacture of sulphate cellulose, the pH of said white liquor having first been adjusted to a value of about 13.5.

References Cited in the file of this patent

UNITED STATES PATENTS

| | | |
|---|---|---|
| 2,576,753 | Fisher et al. | Nov. 27, 1951 |
| 2,602,089 | Pearl | July 1, 1952 |
| 2,686,120 | Marshall et al. | Aug. 10, 1954 |

OTHER REFERENCES

Bray et al.: Article, Paper Trade Journal of October 26, 1939, pp. 224–225.

Pulp and Paper Manufacture, vol. I, published by McGraw-Hill Book Co., Inc., New York, 1950, p. 374.